US012723869B2

(12) United States Patent
Lim et al.

(10) Patent No.: US 12,723,869 B2
(45) Date of Patent: Sep. 1, 2026

(54) CLEARANCE MEASURING APPARATUS

(71) Applicant: SAMSUNG SDI CO., LTD., Yongin-si (KR)

(72) Inventors: Heetaek Lim, Yongin-si (KR); Yongseung Shin, Yongin-si (KR); Junhaeng Cho, Yongin-si (KR); Sungkyun Jung, Yongin-si (KR); Seungjun Lee, Yongin-si (KR); Joonkil Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 163 days.

(21) Appl. No.: 18/584,974

(22) Filed: Feb. 22, 2024

(65) Prior Publication Data

US 2025/0146808 A1 May 8, 2025

(30) Foreign Application Priority Data

Nov. 3, 2023 (KR) ........................ 10-2023-0151073

(51) Int. Cl.
*G01B 11/14* (2006.01)
*B21C 51/00* (2006.01)

(52) U.S. Cl.
CPC .............. *G01B 11/14* (2013.01); *B21C 51/00* (2013.01)

(58) Field of Classification Search
CPC ....... G01B 11/022; G01B 11/14; B21C 51/00; B21D 28/16; B21D 28/26; Y10T 83/822; Y10T 83/828
See application file for complete search history.

(56) References Cited

U.S. PATENT DOCUMENTS 2,155,248 A * 4/1939 Adams ............... G02B 21/0016 D10/64
2,397,933 A * 4/1946 Fowle .................. B23Q 35/128 451/6
10,160,021 B2 * 12/2018 Kraft ...................... B21D 22/20
2010/0018374 A1 * 1/2010 Kumamoto ............ G01B 11/14 83/520
2023/0182370 A1 6/2023 Chi et al.
2025/0391050 A1 * 12/2025 Jung ...................... G01B 11/14

FOREIGN PATENT DOCUMENTS

CN 209918598 U * 1/2020
CN 116485874 B 8/2023
DE 3445254 A1 6/1986

(Continued)

OTHER PUBLICATIONS

Extended European Search Report issued in corresponding EP Application No. 24176736.7, dated Nov. 13, 2024, 8 pages.

*Primary Examiner* — Gordon J Stock, Jr.
(74) *Attorney, Agent, or Firm* — Womble Bond Dickinson (US) LLP

(57) ABSTRACT

One or more embodiments of the present disclosure provides a clearance-measuring apparatus including an image sensor in a mold including a frame, a punch on the frame and configured to be moved in a vertical direction, and a die on the frame and spaced apart from the punch, the image sensor being configured to capture an image of a space between the punch and the die, and a controller configured to measure a clearance of the punch and the die based on the image.

18 Claims, 12 Drawing Sheets

(56) References Cited

FOREIGN PATENT DOCUMENTS

| | | | | | |
|---|---|---|---|---|---|
| JP | 57-169604 | A | | 10/1982 | |
| JP | S59153529 | A | * | 9/1984 | |
| JP | S6012236 | A | * | 1/1985 | |
| JP | S61126932 | A | * | 6/1986 | |
| JP | S6238726 | A | * | 2/1987 | |
| JP | 64001902 | A | * | 1/1989 | |
| JP | 2010110822 | A | * | 5/2010 | ............. G01B 11/14 |
| KR | 10-2005-0034500 | A | | 4/2005 | |
| KR | 20080022349 | A | * | 3/2008 | ............... G01B 3/18 |
| KR | 10-2022-0069178 | A | | 5/2022 | |
| SU | 1221487 | A1 | * | 3/1986 | |

* cited by examiner

CLEARANCE MEASURING APPARATUS

CROSS-REFERENCE TO RELATED APPLICATION

The present application claims priority to and the benefit of Korean Patent Application No. 10-2023-0151073, filed on Nov. 3, 2023, in the Korean Intellectual Property Office, the entire disclosure of which is incorporated herein by reference.

BACKGROUND

1. Field

The present disclosure relates to a clearance-measuring apparatus.

2. Description of the Related Art

A rechargeable battery may be repeatedly charged and discharged, unlike a primary battery that may not be recharged. A small-capacity rechargeable battery having a single pack electrode assembly is used in small portable electronic devices, such as mobile phones, camcorders, and the like, while a large-capacity rechargeable battery having several tens of electrode assemblies connected to each other is widely used as a motor-driving power source, such as in an electric scooter, a hybrid vehicle, or an electric vehicle.

The rechargeable battery includes an electrode plate, and the electrode plate is generally manufactured by being processed with a shear mold. The shear mold includes a punch and a die. A gap between the punch and the die is referred to as a clearance.

This clearance is a factor considered when designing a mold. In detail, if the clearance is not appropriate, a shear cross section is uneven, and the generation of foreign substances, such as burrs, may intensify, resulting in a decrease in overall product quality and a shortened lifespan of the mold.

The thinnest portion of the electrode where the shear occurs is the metal substrate, and the thickness of the metal substrate is very thin (e.g., about 10 μm). To shear the electrode without burrs that may occur on the shear surface of the electrode, the clearance is processed to a very low value. However, because conventional measuring equipment cannot measure the clearance of a precisely processed shear mold used to manufacture an electrode of a rechargeable battery, the measuring equipment is used depending on the precision of the processing machine that processes the mold.

After the clearance of the punch and die is set at the beginning of operation, even if the clearance changes slightly during the repetitive shearing process, the clearance cannot be detected, resulting in the production of defective products.

SUMMARY

The present disclosure attempts to overcome the above-mentioned conventional problem, and an aspect of the present disclosure provides a clearance-measuring apparatus that may accurately measure the clearance of a mold used to manufacture an electrode of a rechargeable battery.

One or more embodiments of the present disclosure provide a clearance-measuring apparatus including an image sensor in a mold including a frame, a punch on the frame and configured to be moved in a vertical direction, and a die on the frame and spaced apart from the punch, the image sensor being configured to capture an image of a space between the punch and the die, and a controller configured to measure a clearance of the punch and the die based on the image.

The clearance-measuring apparatus may further include a light source on the frame, and configured to irradiate light between the die and the punch.

When the punch is lowered to be adjacent to the die, the controller may be configured to operate the image sensor while lowering of the punch is stopped for a reference time.

The clearance-measuring apparatus may further include a laser irradiator coupled to the image sensor, and configured to irradiate a laser to an area photographed by the image sensor.

The clearance-measuring apparatus may include two image sensors respectively on opposite sides based on the mold.

The clearance-measuring apparatus may include a plurality of image sensors radially located around the mold.

The controller may include a storage portion configured to store the image, a measuring portion configured to measure a number of pixels corresponding to a clearance in the image in units of 1 pixel, a processing portion configured to compare the number of pixels with a pre-stored number of pixels corresponding to target clearance, and configured to calculate a clearance correction distance corresponding to a difference value between the number of pixels and the pre-stored number of pixels, and an output portion configured to output the clearance correction distance One or more other embodiments of the present disclosure provide a clearance-measuring apparatus including a base plate having thereon a mold including a frame, a punch on the frame and configured to be moved in a vertical direction, and a die on the frame and spaced apart from the punch, a first driver connecting the base plate and the mold, and configured to move the mold in multiple directions with respect to the base plate, a support on the base plate, and spaced apart from the mold, an image sensor coupled to the support, and configured to capture an image of a space adjacent to the die as the punch lowers, a second driver connecting the image sensor and the support, and configured to move the image sensor in multiple directions with respect to the support, and a controller configured to measure a clearance of the punch and the die based on the image.

The first driver may include a first mover on the base plate, and configured to move in a first direction with respect to the base plate, a second mover in the first mover, and configured to move in a second direction, which is orthogonal to the first direction, with respect to the first mover, and a rotator connecting the second mover and the mold, and configured to rotate the mold in a left-right direction with respect to the second mover.

The second driver may include a slider configured to move the image sensor toward or away from the support, an angle adjuster coupled to the slider, and configured to rotate the slider, and an elevator connecting the angle adjuster and the support, and configured to move the angle adjuster in the vertical direction with respect to the support.

The clearance-measuring apparatus may further include a light source on the frame, and configured to irradiate light between the die and the punch.

The controller may be configured to operate the light source and the image sensor when the punch is lowered to be adjacent to the die.

The clearance-measuring apparatus may further include a chamber coupled to the base plate, surrounding the mold and the image sensor, and configure to block external light irradiated toward the mold and the image sensor.

When the punch is lowered to be adjacent to the die, the controller may be configured to operate the image sensor while lowering of the punch is stopped for a reference time.

The reference time may be within a range of about 0.1 second to about 1 second.

The clearance-measuring apparatus may further include a laser irradiator coupled to the image sensor, and configured to irradiate a laser to an area photographed by the image sensor.

The clearance-measuring apparatus may include two image sensors respectively on opposite sides based on the mold.

The clearance-measuring apparatus may include a plurality of image sensors radially located around the mold.

The controller may include a storage portion configured to store the image, a measuring portion configured to measure a number of pixels corresponding to a clearance in the image in units of 1 pixel, a processing portion configured to compare the number of pixels with a pre-stored number of pixels corresponding to target clearance, and configured to calculate a clearance correction distance corresponding to a difference value between the number of pixels and the pre-stored number of pixels, and an output portion configured to output the clearance correction distance.

The clearance-measuring apparatus according to the present disclosure may photograph the clearance of the punch and die with an image sensor, and may measure the clearance with a controller. A clearance-monitoring process using the clearance-measuring apparatus may be performed not only in the initial setting process of the mold device, but also in the middle of the process of manufacturing the electrode of the rechargeable battery, which is the manufacturing object.

Therefore, after the clearance of the punch and die is set at the beginning of the operation, it is possible to reduce or prevent defective products from being manufactured by detecting slight changes in the clearance during the repetitive shearing process.

The clearance-measuring apparatus according to the present disclosure may measure the clearance of the punch and die included in a high-precision mold device with a camera, the clearance being difficult to measure with a conventional measuring device, and may analyze the clearance with a controller. Therefore, by evaluating the precision-processing state of the punch and die, and by analyzing the cause of the problem, it is possible to reduce or minimize burrs of the shear surface of the electrode, and to improve the durability of the electrode mold.

DETAILED DESCRIPTION

Figure 1:
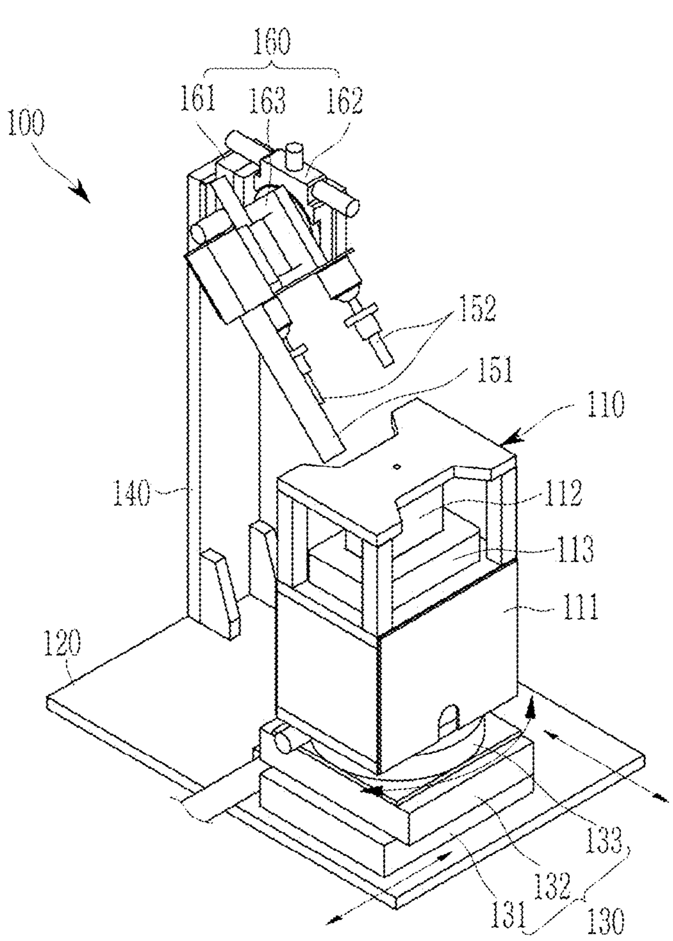
FIG. 1 illustrates a perspective view of a clearance-measuring apparatus according to first one or more embodiments of the present disclosure.
Figure 1:
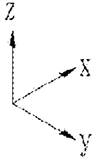

Hereinafter, embodiments of the present disclosure will be described, in detail, with reference to the accompanying drawings such that they can easily be made and used by those skilled in the art. The present disclosure may, however, be embodied in many different forms and should not be construed as being limited to the embodiments set forth herein. Rather, these embodiments are provided so that this disclosure will be thorough and complete and will fully convey the concept of the present disclosure to those skilled in the art.

In addition, thickness or sizes of layers in the drawings are exaggerated for convenience of explanation and clarity, and like numbers refer to like elements in the drawings. As used herein, the term "and/or" includes any and all combinations of one or more of the associated listed items. In addition, it will also be understood that when an element A is referred to as being "coupled to" or "connected to" an element B, the element A can be directly coupled or connected to the element B or an intervening element C may be present therebetween such that the element A and the element B are indirectly connected to each other.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprise, include," "comprising," and/or "including," when used in this specification, specify the presence of the stated features, integers, steps, operations, elements, and/or components but do not preclude the presence or addition of one or more other features, integers, steps, operations, elements, components, and/or groups thereof.

It will also be understood that, although the terms first, second, and the like may be used herein to describe various members, elements, regions, areas, layers, and/or sections, these members, elements, regions, areas, layers and/or sections should not be limited by these terms. These terms are only used to distinguish one member, element, region, area, layer, and/or section from another. Thus, for example, a first member, a first element, a first region, a first area, a first layer, or a first section described below could be termed a second member, a second element, a second region, a second area, a second layer, or a second section without departing from the teachings of the present disclosure.

Spatially relative terms, such as "below," "beneath," "lower," "above," "upper," and the like, may be used herein for ease of description to describe one element or feature's relationship to another element(s) or feature(s) as illustrated in the drawings. It will be understood that the spatially relative terms are intended to encompass different orientations of the device in use or operation in addition to the orientation depicted in the drawings. For example, when the device in the drawings is turned over, elements described as "below" or "beneath" other elements or features would then be oriented "on" or "above" the other elements or features. Thus, the term "below" can encompass both an orientation of above and below.

Hereinafter, a rechargeable battery according to embodiments of the present disclosure will be described in detail with reference to the accompanying drawings.

Figure 2:
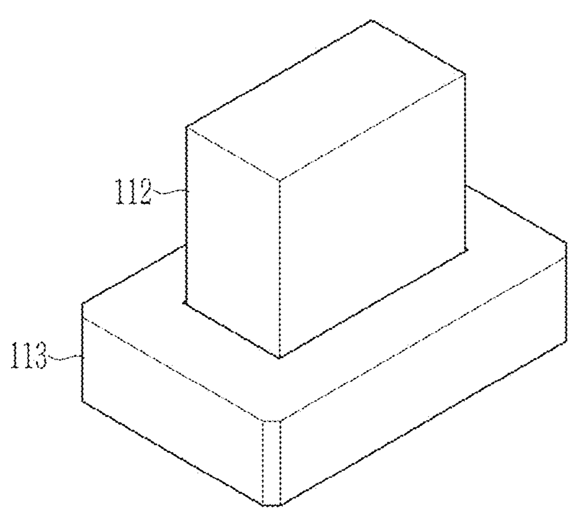
FIG. 2 illustrates a perspective view of a punch and a die extracted from the clearance-measuring apparatus of FIG. 1.
Figure 3:
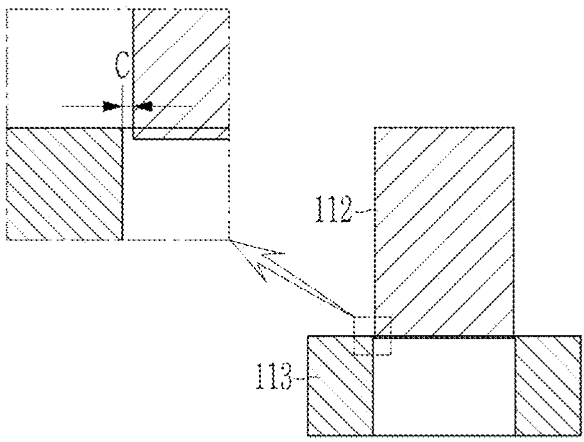
FIG. 3 illustrates a cross-sectional view of the punch and the die of FIG. 2.
Figure 4:
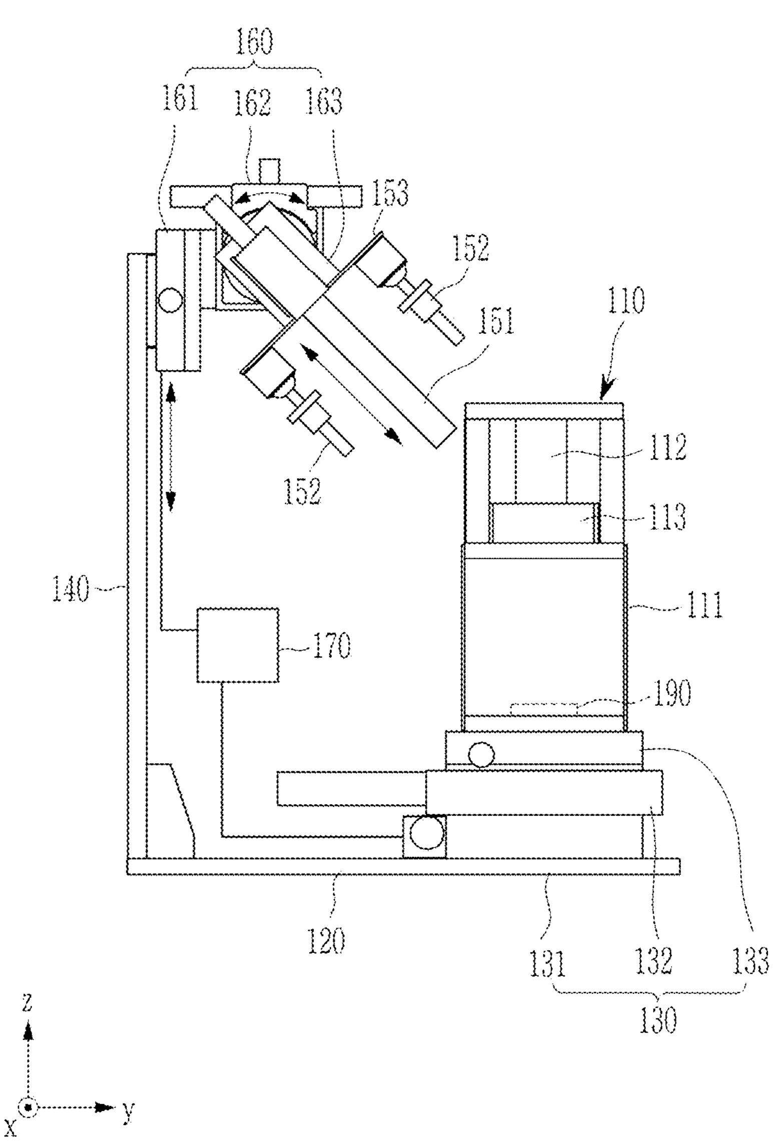
FIG. 4 illustrates a cross-sectional view of the clearance-measuring apparatus of FIG. 1.

FIG. 1 illustrates a perspective view of a clearance-measuring apparatus according to first one or more embodiments of the present disclosure, FIG. 2 illustrates a perspective view of a punch and a die extracted from the clearance-measuring apparatus of FIG. 1, FIG. 3 illustrates a cross-sectional view of the punch and the die of FIG. 2, and FIG. 4 illustrates a cross-sectional view of the clearance-measuring apparatus of FIG. 1.

As shown in FIG. 1 to FIG. 4, a clearance-measuring apparatus 100 according to one or more embodiments of the present disclosure includes an image sensor (e.g., photographing member or camera) 151 and a controller 170.

The image sensor 151 may photograph a space between a punch 112 and a die 113 in a mold (e.g., mold unit) 110. The image sensor 151 may be, for example, a camera that photographs an object. The image sensor 151 may be an ultra-high definition high-resolution camera among various cameras, but is not limited thereto.

The mold 110 includes a frame 111, the punch 112 installed on the frame 111 to vertically move, and the die 113 installed on the frame 111 to be spaced apart from the punch 112. In one or more embodiments, the punch 112 may be lowered and raised by a driving device, and a detailed description of the mold 110 will be omitted.

The controller 170 measures a clearance C of the punch 112 and the die 113 based on the image obtained by the image sensor 151. A detailed description of the controller 170 will be described later.

To describe the clearance-measuring apparatus 100 in more detail, the clearance-measuring apparatus 100 may include a base plate 120, a first driver (e.g., first driving unit) 130, a support (e.g., support member) 140, and a second driver (e.g., second driving unit) 160.

The mold 110 is installed on the base plate 120. The base plate 120 may be plate shaped. The first driver 130, the support 140, and the second driver 160, which will be described later, may also be installed on the base plate 120. The base plate 120 may be installed in a workspace or on the ground.

The first driver 130 is installed to connect the base plate 120 and the mold 110, and may move the mold 110 in multiple directions with respect to the base plate 120.

The first driver 130 may include, for example, a first mover (e.g., first moving member) 131, a second mover (e.g., second moving member) 132, and a rotator (e.g., rotating member) 133.

The first mover 131 is installed on the base plate 120, and may move in a first direction (x-axis direction) with respect to the base plate 120.

The second mover 132 is installed on the first mover 131, and may move in a second direction (y-axis direction) orthogonal to the first direction with respect to the first mover 131.

The rotator 133 is installed to connect the second mover 132 and the mold 110, and may rotate the mold 110 in the left and right directions with respect to the second mover 132.

The support 140 is installed to be spaced apart from the mold 110 on the base plate 120. The above-described image sensor 151 is coupled to the support 140, and may photograph a space adjacent to the die 113 while the punch 112 lowers.

The second driver 160 is installed to connect the image sensor 151 and the support 140, and may move the image sensor 151 in multiple directions with respect to the support 140. This second driver 160 may include, for example, a slider (e.g., sliding member) 161, an angle adjuster (e.g., angle-adjusting member) 162, and an elevator (e.g., lifting member) 163.

The slider 161 may move the image sensor 151 in a direction away from or closer to the support 140.

The angle adjuster 162 is coupled to the slider 161, and may rotate the slider 161 in the vertical direction.

The elevator 163 is installed to connect the angle adjuster 162 and the support 140, and may move the angle adjuster 162 vertically with respect to the support 140.

Figure 5:
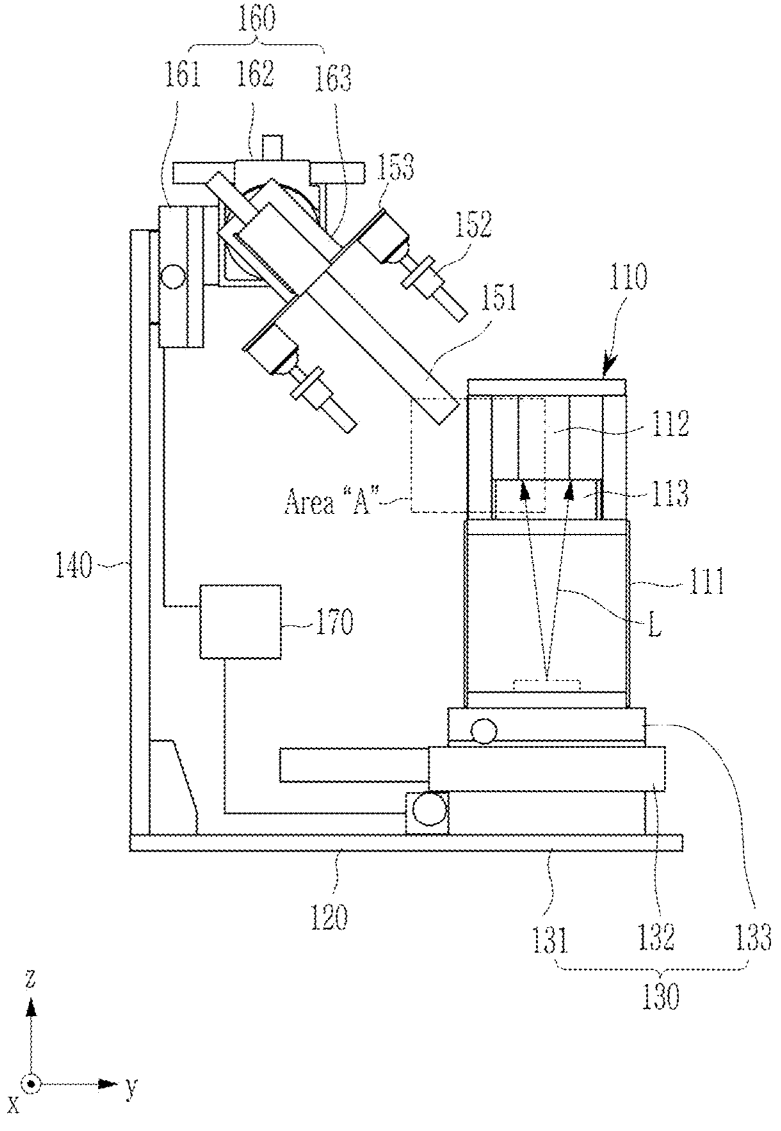
FIG. 5 illustrates a cross-sectional view of a process in which light is irradiated from a light source between a punch and a die.
Figure 6:
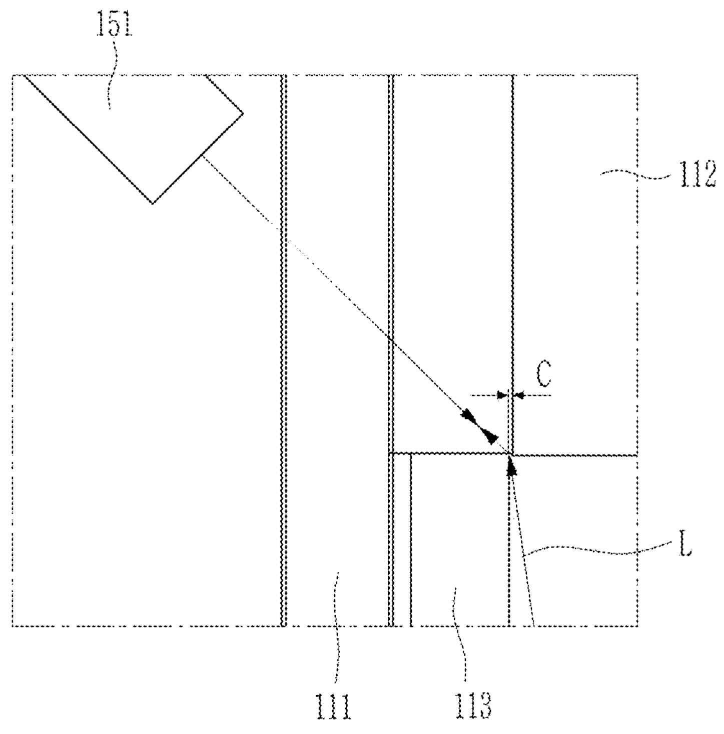
FIG. 6 illustrates an enlarged view of area "A" of FIG. 5.

FIG. 5 illustrates a cross-sectional view of a process in which light is irradiated from a light source (e.g., light source member) between a punch and a die, and FIG. 6 illustrates an enlarged view of area "A" of FIG. 5.

Referring to FIG. 5 and FIG. 6, the clearance-measuring apparatus 100 may further include a light source 190.

The light source 190 is installed in the frame 111, and may irradiate light L between the die 113 and the punch 112. If the area between the punch 112 and the die 113 is dark, it may be difficult to check the clearance C between the punch 112 and the die 113 in the image captured by the image sensor 151. The light source 190 bay irradiate the light L between the punch 112 and the die 113, so that the boundaries of the punch 112, the die 113, and the clearance C may be clearly distinguished in the image.

The above-described controller 170 may operate the light source 190 and the image sensor 151 if the punch 112 is lowered to be adjacent to the die 113. Measurement of the clearance C by the image sensor 151 may be accurately performed.

In one or more embodiments, if the punch 112 is lowered to be adjacent to the die 113 (the positions of the punch and the die shown in FIG. 3), the controller 170 may operate the image sensor 151 while stopping the lowering of the punch 112 for a reference time. The reference time may be within the range of about 0.1 second to about 1 second.

If the reference time is less than about 0.1 second, a time sufficient for the image sensor 151 to measure the clearance C may not be secured. In one or more embodiments, if the reference time exceeds about 1 second, the time for measuring the clearance C may be unnecessarily long. In one or more embodiments, because the image sensor 151 may be operated while the lowering of the punch 112 is stopped for the reference time, the clearance C by the image sensor 151 may be more accurately measured.

In one or more embodiments, the clearance-measuring apparatus 100 according to one or more embodiments of the present disclosure may further include a laser irradiator (e.g., laser-irradiating member) 152.

The laser irradiator 152 is coupled to the image sensor 151, and may irradiate a laser to an area photographed by the image sensor 151. A target area photographed by the image sensor 151 may be changed by the first driver 130 and the second driver 160. The laser irradiator 152 may irradiate a laser to the punch 112 or the die 113, and the image sensor 151 may detect the laser to change the focus or to quickly detect the target area.

There may be two laser irradiators 152, which may be spaced apart from each other by a separate bracket 153. The two laser irradiators 152 may always maintain the focus of the image sensor 151 on the target area. Even if the relative position between the image sensor 151 and the target area including the punch 112 and the die 113 is changed, or if the type of the punch 112 and the die 113 is changed, the image sensor 151 may accurately and quickly photograph the target area.

In one or more embodiments, the thinnest portion of the electrode of a general rechargeable battery where shear occurs is a metal substrate, and the thickness of the metal substrate is manufactured very thin (e.g., about 10 μm). Therefore, to shear the electrode without burrs on the shear surface, the clearance is processed to a significantly low value. The clearance between the punch 112 and the die 113 is about 1 μm to about 3 μm, and conventionally, there has been no measuring instrument capable of measuring this level of clearance.

As described above, the clearance-measuring apparatus 100 may photograph the clearance C of the punch 112 and the die 113 with the image sensor 151, and may measure the clearance C with the controller 170. The process of measuring/monitoring the clearance C through the clearance-measuring apparatus 100 may be performed not only in the initial setting process of the mold 110 immediately before the electrode is manufactured, but also in the middle of the process of manufacturing the electrode to be manufactured.

Therefore, after the clearance C of the punch 112 and the die 113 is set in the initial operation, it is possible to detect a slight change in the clearance C during the repetitive shear process to reduce or prevent defective products from being manufactured.

In one or more embodiments, the clearance-measuring apparatus 100 may measure the clearance of the punch 112 and the die 113 included in the high-precision mold 110 that is difficult to measure with a conventional measuring apparatus with a camera, and may analyze the clearance with the controller 170. Therefore, by evaluating the precision-processing state of the punch 112 and the die 113, and by analyzing the cause of the problem, it is possible to reduce or minimize burrs of the shear surface of the electrode, and to improve the durability of the electrode mold.

Figure 7:
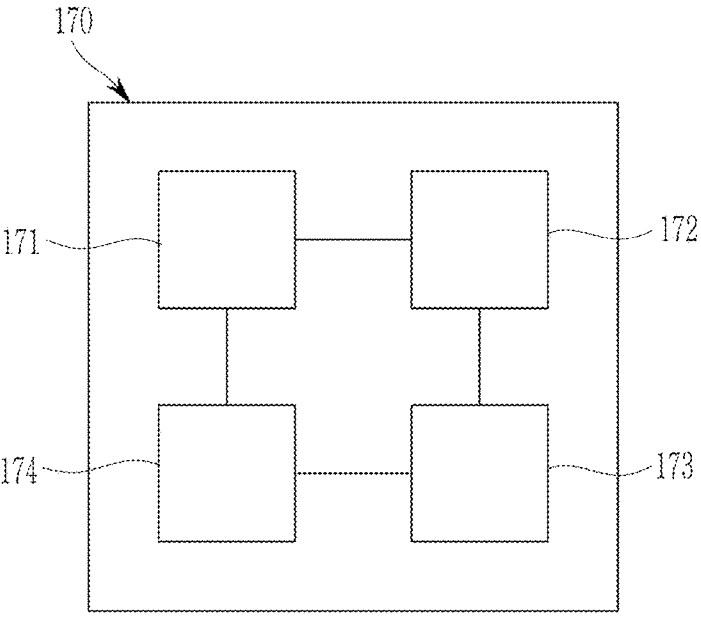
FIG. 7 illustrates a block diagram of a controller.

FIG. 7 illustrates a block diagram of a controller.

Referring to FIG. 7, the controller 170 may include, for example, a storage portion 171, a measuring portion 172, a processing portion 173, and an output portion 174.

The storage portion 171 may store the image. The storage portion 171 may be, for example, a memory, and may be integrated into one microprocessor together with the measuring portion 172 and the processing portion 173 to be described later.

Figure 8:
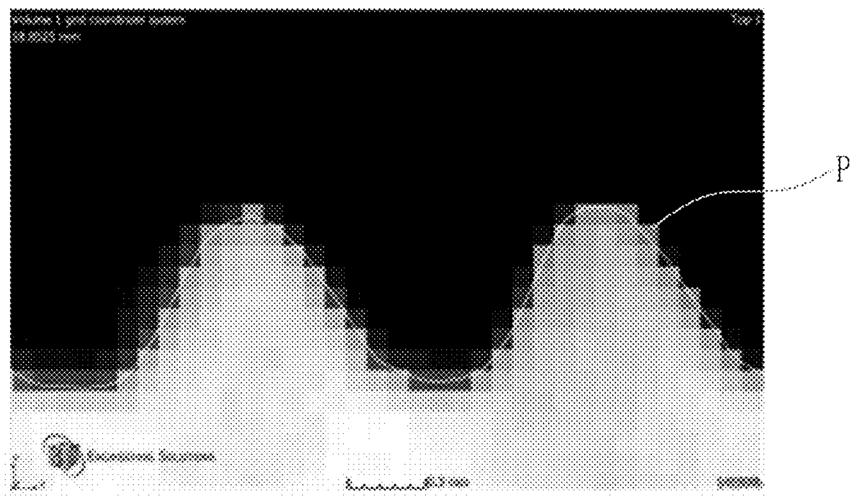
FIG. 8 illustrates a photograph of an enlarged portion of an image captured by an image sensor.

The measuring portion 172 may measure the number of pixels corresponding to the clearance in the image in units of one pixel P (e.g., see FIG. 8). The measuring portion 172 may analyze the image, may divide the boundary of each of the punch 112, the die 113, and the clearance, and may measure the number of pixels of the clearance in units of one pixel P.

With reference to Equation 1 below, the processing portion 173 may compare a measured number of pixels Px2 with a pre-stored number of pixels Px1 in the case of target clearance. In one or more embodiments, the processing portion 173 calculates a clearance correction distance corresponding to a difference value Px3 between the measured number of pixels Px2 and the pre-stored number of pixels Px1. The difference value Px3 between the measured number of pixels Px2 and the pre-stored number of pixels Px1 may satisfy Equation 1 below.

$$Px3 = Px1(\text{range}) - Px2 \quad \text{(Equation 1)}$$

In one or more embodiments, if the target clearance of the punch 112 and the die 113 is about 1 μm to about 3 μm, the number of pre-stored pixels Px1 in the case of the target clearance may range from about 10 to about 30. For better comprehension and ease of description, it is assumed that 10 pixels are about 1 μm if converted into an actual distance.

For example, if the number of measured pixels Px2 is 40, the clearance difference value Px3, which is the difference between the number of pre-stored pixels Px1 and the maximum value of 30, is −10, and the clearance correction distance between the punch 112 and the die 113 should be reduced by about 1 μm. Differently, if the number of measured pixels Px2 is 5, the clearance difference value Px3, which is the difference between the number of pre-stored pixels Px1 and the minimum value of 10, is 5, and the clearance correction distance between the punch 112 and the die 113 should be increased by about 0.5 μm.

The output portion 174 outputs the clearance correction distance. The output portion 174 may be, for example, a monitor or a printer. The user may check the clearance state of the punch 112 and the die 113 by checking the outputted clearance correction distance.

The controller 170 as described above may quickly process the image measured by the image sensor 151, and may calculate the clearance correction distance, so that the user may monitor the clearance state of the punch 112 and the die 113 in real time.

In one or more embodiments, if it is suitable to reset the clearance C according to the clearance correction distance, additional work may be performed to adjust the position of the punch, or to reprocess the shape of the punch. In one or more embodiments, if the wear or position of the punch cannot be adjusted, the punch may be replaced, and the clearance reset of the punch and die is not limited to the above method.

Figure 9:
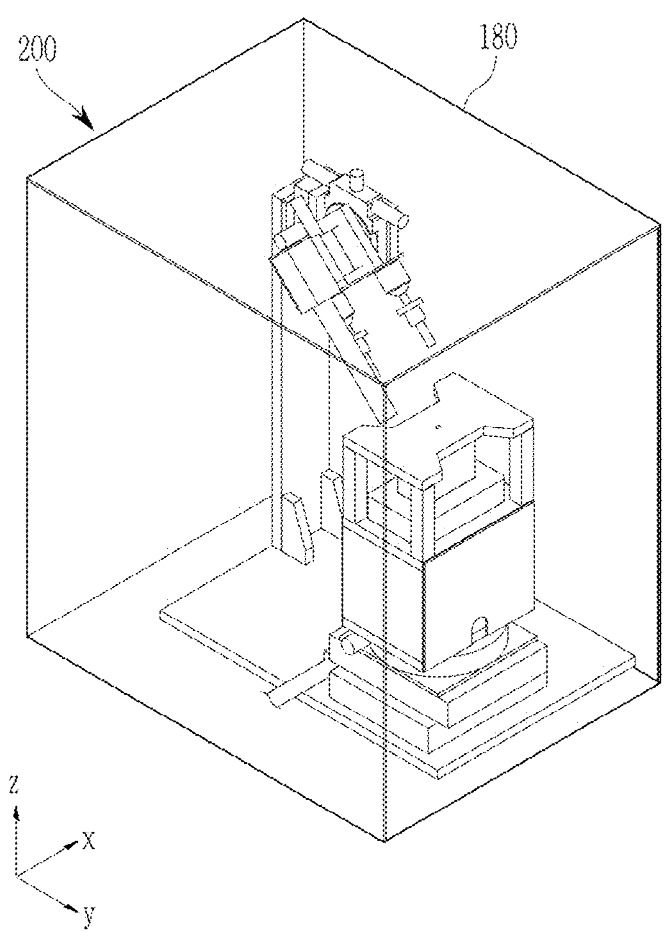
FIG. 9 illustrates a perspective view of a clearance-measuring apparatus according to second one or more embodiments of the present disclosure.

FIG. 9 illustrates a perspective view of a clearance-measuring apparatus according to one or more other embodiments of the present disclosure.

Referring to FIG. 9, a clearance-measuring apparatus 200 according to one or more other embodiments of the present disclosure may further include a chamber (e.g., blackout member) 180.

The chamber 180 may be coupled to the base plate 120, may be installed to surround the mold 110 and the image sensor 151, and may block external light from being irradiated to the mold 110 and the image sensor 151, and the image sensor 151 may obtain a clearer image.

Figure 10:
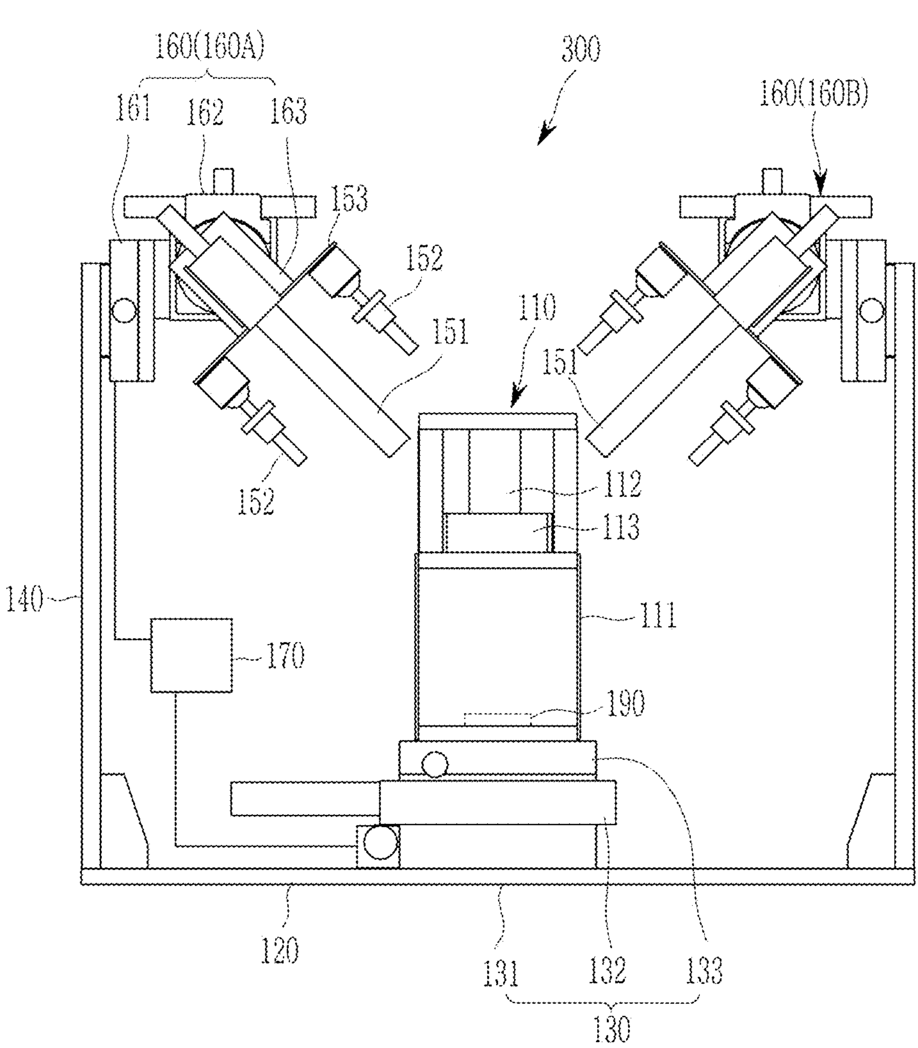
FIG. 10 illustrates a front view of a clearance-measuring apparatus according to third one or more embodiments of the present disclosure.

FIG. 10 illustrates a front view of a clearance-measuring apparatus according to one or more other embodiments of the present disclosure.

A clearance-measuring apparatus 300 according to the one or more other embodiments of the present disclosure may include two image sensors 151, which may be installed on opposite sides of each other around the mold 110. There may be two second drivers 160A and 160B.

Figure 11:
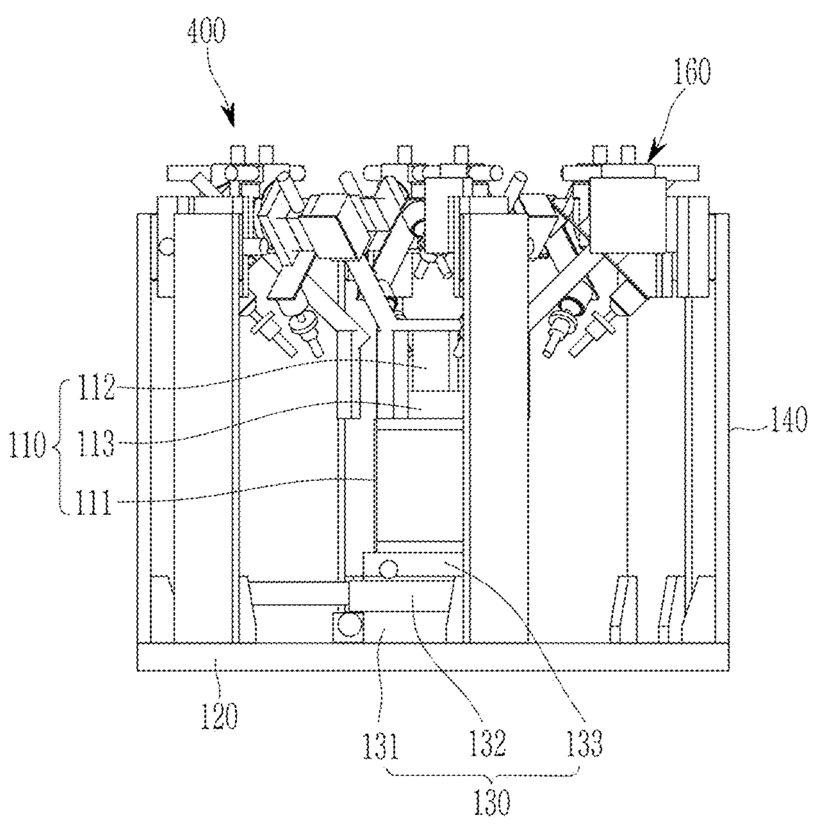
FIG. 11 illustrates a front view of a clearance-measuring apparatus according to fourth one or more embodiments of the present disclosure.
Figure 12:
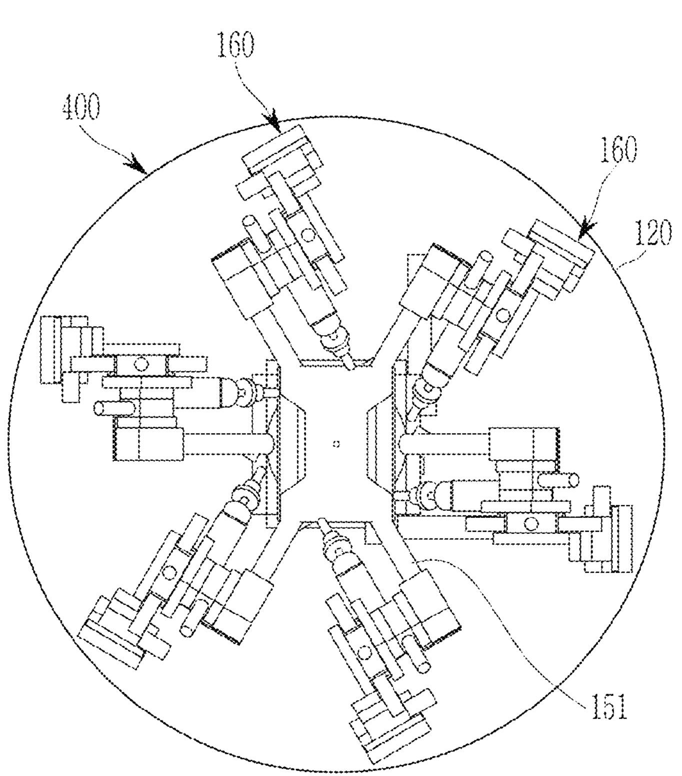
FIG. 12 illustrates a top plan view of the clearance-measuring apparatus of FIG. 11.

FIG. 11 illustrates a front view of a clearance-measuring apparatus according to one or more other embodiments of the present disclosure, and FIG. 12 illustrates a top plan view of the clearance-measuring apparatus of FIG. 11.

Referring to FIG. 11 and FIG. 12, a clearance-measuring apparatus 400 according to the fourth one or more embodiments of the present disclosure may include a plurality of image sensors 151.

The plurality of image sensors 151 may be provided, and the plurality of image sensors 151 may be radially located around the mold 110.

In one or more embodiments, referring back to FIG. 1, the clearance-measuring apparatus 100 according to the embodiments described above may measure the clearance C (see FIG. 3) of the mold 110 used to manufacture the electrode plate of the rechargeable battery.

A typical rechargeable battery may include an electrode assembly. The electrode assembly may include a plurality of electrode plates and separators. Each of the electrode plates includes an electrode substrate tab, and may be stacked on each other.

The electrode assembly may have a form in which a laminate including a first electrode plate, a second electrode plate, and a separator is repeatedly wound or stacked. For example, the electrode assembly may be of a repeatedly wound jelly-roll type. In one or more embodiments, the electrode assembly may be of a plurality, and the plurality of electrode assemblies may be of a stacked type that is stacked in a plurality of layers. Detailed descriptions of the rechargeable battery will be omitted.

In one or more embodiments, the method of manufacturing the electrode plate included in the electrode assembly as described above may be manufactured by, for example, forming a certain shape on a metal plate using a mold. As described above, the clearance of the punch 112 and the die 113 is maintained within the target value range by the clearance-measuring apparatus 100 according to the present disclosure, thereby reducing the defect rate if manufacturing electrodes, and productivity may also be improved.

Although several embodiments of the present disclosure have been described above, while this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims. Therefore, those skilled in the art will understand that various modifications and other equivalent embodiments of the present disclosure are possible. Consequently, the true technical protective scope of the present disclosure must be determined based on the technical spirit of the appended claims, with functional equivalents thereof to be included therein.

| Description of Symbols | |
|---|---|
| 100: clearance-measuring apparatus | |
| 110: mold | 111: frame |
| 112: punch | 113: die |
| 120: base plate | 130: first driver |
| 131: first mover | 132: second mover |
| 133: rotator | 140: support |
| 151: image sensor | 152: laser irradiator |
| 160: second driver | 161: slider |
| 162: angle adjuster | 163: elevator |
| 170: controller | 171: storage portion |
| 172: measuring portion | 173: processor |
| 174: output portion | 180: blackout member |
| 190: light source | C: clearance |

What is claimed is:

1. A clearance-measuring apparatus comprising:

an image sensor directed at a mold comprising a frame, a punch on the frame and configured to be moved in a vertical direction, and a die on the frame and spaced apart from the punch, the image sensor being configured to capture an image of a space between the punch and the die;

a controller configured to measure a clearance of the punch and the die based on the image; and a light source on the frame and under the die and the punch, and configured to irradiate light between the die and the punch.

2. The clearance-measuring apparatus as claimed in claim 1, wherein, when the punch is lowered to be adjacent to the die, the controller is configured to operate the image sensor while lowering of the punch is stopped for a reference time.

3. The clearance-measuring apparatus as claimed in claim 1, further comprising a laser irradiator coupled to the image sensor, and configured to irradiate a laser to an area photographed by the image sensor.

4. The clearance-measuring apparatus as claimed in claim 1, comprising two image sensors respectively on opposite sides based on the mold.

5. The clearance-measuring apparatus as claimed in claim 1, comprising a plurality of image sensors radially located around the mold.

6. The clearance-measuring apparatus as claimed in claim 1, wherein the controller comprises:

a storage portion configured to store the image;

a measuring portion configured to measure a number of pixels corresponding to a clearance in the image in units of 1 pixel;

a processing portion configured to compare the number of pixels with a pre-stored number of pixels corresponding to target clearance, and configured to calculate a clearance correction distance corresponding to a difference value between the number of pixels and the pre-stored number of pixels; and an output portion configured to output the clearance correction distance.

7. A clearance-measuring apparatus comprising:

a base plate having thereon a mold comprising a frame, a punch on the frame and configured to be moved in a vertical direction, and a die on the frame and spaced apart from the punch;

a first driver connecting the base plate and the mold, and configured to move the mold in multiple directions with respect to the base plate;

a support on the base plate, and spaced apart from the mold;

an image sensor coupled to the support, and configured to capture an image of a space adjacent to the die as the punch lowers;

a second driver connecting the image sensor and the support, and configured to move the image sensor in multiple directions with respect to the support; and a controller configured to measure a clearance of the punch and the die based on the image.

8. The clearance-measuring apparatus as claimed in claim 7, wherein the first driver comprises:

a first mover on the base plate, and configured to move in a first direction with respect to the base plate;

a second mover in the first mover, and configured to move in a second direction, which is orthogonal to the first direction, with respect to the first mover; and a rotator connecting the second mover and the mold, and configured to rotate the mold in a left-right direction with respect to the second mover.

9. The clearance-measuring apparatus as claimed in claim 7, further comprising a light source on the frame, and configured to irradiate light between the die and the punch.

10. The clearance-measuring apparatus as claimed in claim 7, further comprising a chamber coupled to the base plate, surrounding the mold and the image sensor, and configure to block external light irradiated toward the mold and the image sensor.

11. The clearance-measuring apparatus as claimed in claim 7, further comprising a laser irradiator coupled to the image sensor, and configured to irradiate a laser to an area photographed by the image sensor.

12. The clearance-measuring apparatus as claimed in claim 7, comprising two image sensors respectively on opposite sides based on the mold.

13. The clearance-measuring apparatus as claimed in claim 7, comprising a plurality of image sensors radially located around the mold.

14. The clearance-measuring apparatus as claimed in claim 7, wherein the controller comprises a storage portion configured to store the image;

a measuring portion configured to measure a number of pixels corresponding to a clearance in the image in units of 1 pixel;

a processing portion configured to compare the number of pixels with a pre-stored number of pixels corresponding to target clearance, and configured to calculate a clearance correction distance corresponding to a difference value between the number of pixels and the pre-stored number of pixels; and an output portion configured to output the clearance correction distance.

15. The clearance-measuring apparatus as claimed in claim 7, wherein the second driver comprises:

a slider configured to move the image sensor toward or away from the support;

an angle adjuster coupled to the slider, and configured to rotate the slider; and an elevator connecting the angle adjuster and the support, and configured to move the angle adjuster in the vertical direction with respect to the support.

16. The clearance-measuring apparatus as claimed in claim 9, wherein the controller is configured to operate the light source and the image sensor when the punch is lowered to be adjacent to the die.

17. The clearance-measuring apparatus as claimed in claim 7, wherein, when the punch is lowered to be adjacent to the die, the controller is configured to operate the image sensor while lowering of the punch is stopped for a reference time.

18. The clearance-measuring apparatus as claimed in claim 17, wherein the reference time is within a range of about 0.1 second to about 1 second.

* * * * *